United States Patent
Smith et al.

(10) Patent No.: US 11,725,667 B2
(45) Date of Patent: Aug. 15, 2023

(54) AIR SOURCE SYSTEM OF AN AGRICULTURAL SYSTEM

(71) Applicant: CNH Industrial America LLC, New Holland, PA (US)

(72) Inventors: Kevin Michael Smith, Narvon, PA (US); Trevor Philip Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 343 days.

(21) Appl. No.: 16/730,441

(22) Filed: Dec. 30, 2019

(65) Prior Publication Data

US 2021/0203210 A1    Jul. 1, 2021

(51) Int. Cl.
| | | |
|---|---|---|
| *F04D 29/42* | (2006.01) | |
| *H02K 9/04* | (2006.01) | |
| *F04D 25/06* | (2006.01) | |
| *F04D 17/08* | (2006.01) | |
| *H02K 7/00* | (2006.01) | |
| *F04D 29/58* | (2006.01) | |
| *A01C 7/08* | (2006.01) | |
| *A01C 19/02* | (2006.01) | |

(52) U.S. Cl.
CPC .......... *F04D 29/4226* (2013.01); *A01C 7/081* (2013.01); *A01C 19/02* (2013.01); *F04D 17/08* (2013.01); *F04D 25/06* (2013.01); *F04D 29/5806* (2013.01); *H02K 7/003* (2013.01); *H02K 9/04* (2013.01)

(58) Field of Classification Search
CPC ........ F04D 17/08; F04D 25/06; F04D 25/082; F04D 29/4226; F04D 29/5806; F04D 29/626
See application file for complete search history.

(56) References Cited

U.S. PATENT DOCUMENTS

| | | | |
|---|---|---|---|
| 4,086,976 A | | 5/1978 | Holm et al. |
| 4,513,351 A | | 4/1985 | Davis |
| 4,560,395 A | * | 12/1985 | Davis ...................... F24F 8/108 |
| | | | 55/385.2 |
| 4,674,004 A | | 6/1987 | Smith et al. |
| 4,837,663 A | | 6/1989 | Zushi et al. |
| 5,674,425 A | | 10/1997 | Hong |
| 6,280,318 B1 | | 8/2001 | Criss-Puszkiewicz et al. |
| 6,525,936 B2 | | 2/2003 | Beitelmal et al. |

(Continued)

FOREIGN PATENT DOCUMENTS

| | | |
|---|---|---|
| JP | 4750649 82 | 8/2011 |
| JP | 5115609 B2 | 1/2013 |

OTHER PUBLICATIONS

Ping H. Chen, Shyy W. Chang, Kuei F. Chiang and Ji Li, High Power Electronic Component, May 28, 2008, 15 Pages, vol. 2, No. 3, 2008 Bentham Science Publishers Ltd.

*Primary Examiner* — Kenneth J Hansen
(74) *Attorney, Agent, or Firm* — Rebecca Henkel; Rickard DeMille

(57) ABSTRACT

An air source system of an agricultural system includes a fan configured to establish an airflow along an airflow path of the air source system via rotation of the fan, and a motor assembly configured to drive the fan to rotate. The motor assembly is positioned within the airflow path of the air source system.

13 Claims, 5 Drawing Sheets

(56) References Cited

U.S. PATENT DOCUMENTS

| | | | |
|---|---|---|---|
| 6,602,058 B1* | 8/2003 | Stewart | F04D 25/082 |
| | | | 417/366 |
| 6,813,149 B2 | 11/2004 | Faneuf et al. | |
| 7,507,270 B2 | 3/2009 | Maas et al. | |
| 7,735,437 B2 | 6/2010 | Pollington et al. | |
| 8,038,518 B2 | 10/2011 | Marvin et al. | |
| 8,256,544 B2 | 9/2012 | Tarasinski et al. | |
| 2004/0150270 A1* | 8/2004 | Nagayama | H02K 5/20 |
| | | | 310/61 |
| 2005/0016193 A1 | 1/2005 | Tarasinski et al. | |
| 2005/0053495 A1* | 3/2005 | Lebecq | H02K 9/06 |
| | | | 417/423.1 |
| 2009/0274551 A1* | 11/2009 | Messmer | F04D 29/4226 |
| | | | 415/206 |
| 2011/0100342 A1 | 5/2011 | Morais et al. | |
| 2012/0230843 A1 | 9/2012 | Ravipati et al. | |
| 2014/0219835 A1* | 8/2014 | De Filippis | F04D 25/082 |
| | | | 417/366 |
| 2015/0128578 A1 | 5/2015 | Helferich | |
| 2017/0097013 A1* | 4/2017 | Wall, II | F04D 25/082 |

* cited by examiner

AIR SOURCE SYSTEM OF AN AGRICULTURAL SYSTEM

BACKGROUND

The disclosure relates generally to an air source system of an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are used to distribute particulate material, such as seeds, fertilizer, and/or other agricultural product, on or in an agricultural field using various methods. The agricultural seeding implement may be towed behind a work vehicle, such as a tractor. Certain embodiments of agricultural seeding implements include a storage tank in which the particulate material is stored. The particulate material is distributed from the storage tank to row units, and a metering system of each row unit may distribute the particulate material on or in the ground of the agricultural field. The agricultural seeding implement may use air to transport the particulate material throughout the agricultural seeding implement. For example, one or more fans may be used to provide an airflow that carries the particulate material through various components of the agricultural seeding implement. In certain traditional approaches, a motor may be used to drive each fan in rotation so as to establish the airflow. However, operation of the motor may generate heat within certain electrical components of the motor, thereby reducing performance of the motor. Additionally, dust and other debris may accumulate on and/or within the motor during operation, thereby interfering will cooling of the motor.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an air source system of an agricultural system includes a fan configured to establish an airflow along an airflow path of the air source system via rotation of the fan, and a motor assembly configured to drive the fan to rotate. The motor assembly is positioned within the airflow path of the air source system.

DRAWINGS

These and other features, aspects, and advantages of the present disclosure will become better understood when the following detailed description is read with reference to the accompanying drawings in which like characters represent like parts throughout the drawings, wherein.

Figure 1:
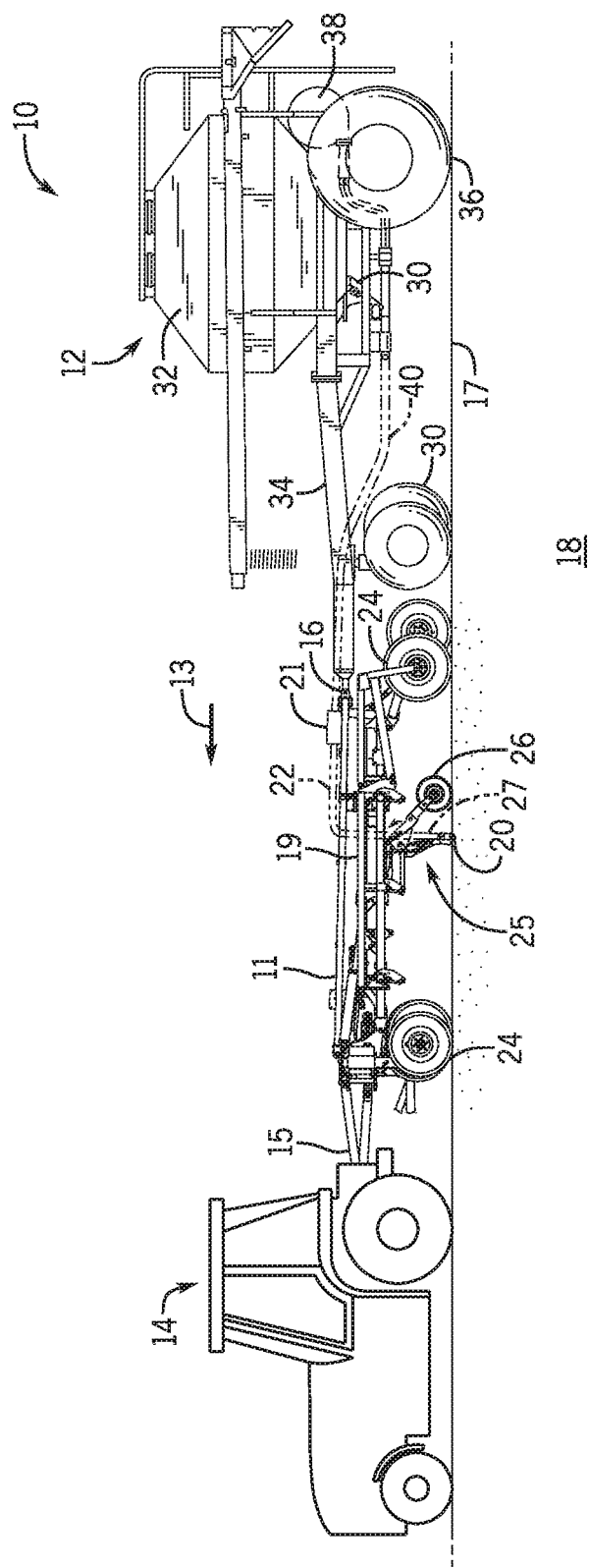
FIG. 1 is a side view of an embodiment of an agricultural system that includes an agricultural implement coupled to an air cart, in accordance with an aspect of the present disclosure.
Figure 4:
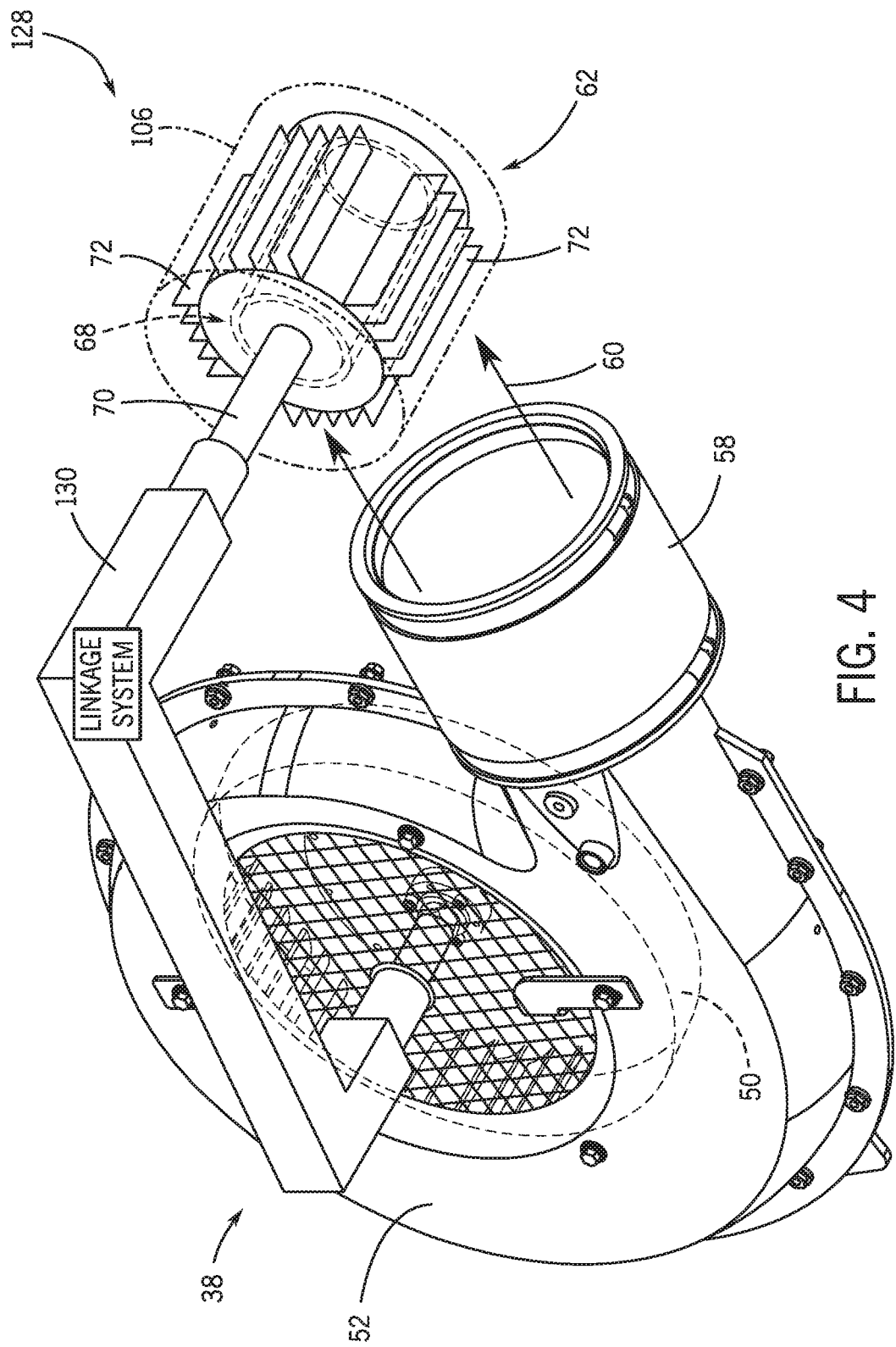
Figure 5:
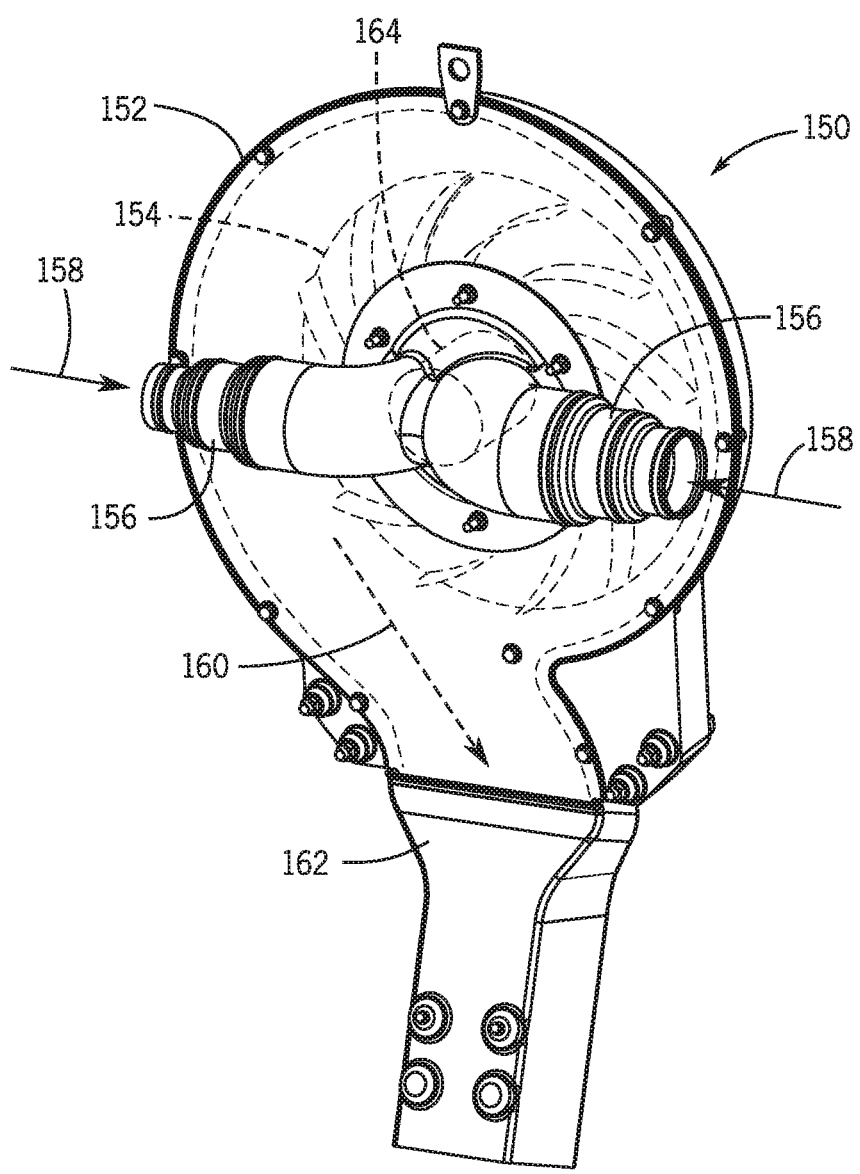

FIG. 4 is a schematic view of a further embodiment of an air source system that may be employed within the agricultural system of FIG. 1, in which a shaft of a motor assembly does not extend directly toward a fan of an air source, in accordance with an aspect of the present disclosure; and FIG. 5 is a perspective view of another embodiment of an air source system that may be employed within an agricultural system, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system having an air source system configured to establish an airflow through certain components of the agricultural system. Agricultural systems (e.g., including an air cart and an implement) may transport particulate material (e.g., seeds, fertilizer, and/or other agricultural products) through various components of the agricultural system for distribution onto or into a field. For example, the particulate material may flow from a storage tank through a metering system, and the metering system may control the flow of the particulate material to the field. In some embodiments, air may be used to transport the particulate material through certain components of the agricultural system. As an example, the agricultural system may include an air source system configured to provide an airflow that drives the particulate material to move along a desired route through the agricultural system. The airflow may be directed through at least one airflow path (e.g., through a conduit) of the agricultural system and may guide the particulate material along the airflow path so as to transport the particulate material through the agricultural system. In some embodiments, an air source of the air source system may include a fan and a motor coupled to the fan. The motor may drive the fan to rotate to provide the airflow during operation of the agricultural system. Further, as used herein, the airflow path is defined by a configuration of the agricultural system, such as a positioning of the fan to direct the airflow through the agricultural system. Accordingly, the airflow path exists even when the air source system is not in operation (e.g., the fan is not directing airflow through the airflow path).

Operation of the motor may generate heat within certain electrical components of the motor, thereby reducing performance of the motor, such as an efficiency of the motor, and/or affecting a structure (e.g., structural integrity) of components of the motor. In addition, during operation of the motor, dust and/or debris, such as dirt, from the particulate material, may accumulate on and/or within the motor and may interfere with cooling of the motor. For example, heat generation within certain electrical components of the motor and/or accumulation of dust on/within the motor may cause the rotational speed of the fan, which is driven by the motor, to be reduced, thereby reducing a flow rate of the airflow provided by the fan, which may reduce a rate at which the particulate material is transported through the agricultural system.

Thus, in accordance with the present disclosure, the motor may be positioned within the airflow path. For example, a motor assembly may include the motor, the electrical components, and heat sinks. The heat sinks may be configured to transfer heat generated by the electrical components during operation of the motor assembly to the airflow, thereby cooling the electrical components. The motor assembly may be positioned in the airflow path such that the airflow is directed across the heat sinks during operation of the motor assembly. The airflow may increase the amount of heat dissipated by the heat sinks so as to cool the electrical components. Moreover, the airflow may remove dust and debris on and/or within the motor assembly, thereby substantially reducing the accumulation of the dust/debris. In this manner, positioning the motor assembly in the airflow path may improve a performance of the motor and enable the air source system to substantially maintain a target airflow rate or fluid pressure.

Turning now to the drawings, FIG. 1 is a side view of an embodiment of an agricultural system 10 that includes an agricultural implement 11 coupled to an air cart 12. In the depicted embodiment, the air cart 12 is towed behind the agricultural implement 11 relative to a direction of travel 13. In addition, the agricultural implement 11 is coupled to a work vehicle 14 (e.g., a tractor) by a first hitch system 15, and the air cart 12 is coupled to the agricultural implement 11 by a second hitch system 16. While the agricultural implement 11 is towed between the work vehicle 14 and the air cart 12 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled (e.g., autonomous) vehicle.

The agricultural implement 11 may be an agricultural seeding implement configured to deposit rows of particulate material (e.g., seeds) into soil of an agricultural field 18 as the agricultural implement 11 is towed across a surface 17 of the agricultural field 18 by the work vehicle 14. The agricultural implement 11 includes a tool frame 19, a row unit 20 (e.g., a ground engaging opener system) coupled to the tool frame 19, a distribution header 21, a hose 22, and wheel assemblies 24. The wheel assemblies 24 contact the surface 17 to enable the agricultural implement 11 to be towed by the work vehicle 14. As the agricultural implement 11 moves in the direction of travel 13, a row of particulate material may be deposited into the soil by the row unit 20. Although only one row unit 20 is shown, the agricultural implement 11 may include multiple row units organized in a row across a width of the agricultural implement. In some embodiments, the agricultural implement 11 may include a row of 12, 14, 16, 18, 20, or more row units 20, which may each deposit a respective row of particulate material into the soil. Additionally or alternatively, the agricultural implement 11 may include multiple rows of row units.

To facilitate depositing particular material, each row unit 20 includes an opener 25, a press wheel 26, a tube 27, and a hydraulic cylinder. When the opener 25 engages the soil, the opener 25 exerts a force that excavates a trench into the soil as the row unit 20 travels through the agricultural field 18. In the present embodiment, a vertical position of the press wheel 26 controls the depth of the opener 25, and the hydraulic cylinder controls the downward force (e.g., down pressure) applied by the press wheel 26. In addition, the opener 25 may be controlled to establish a target depth of the trench. The particulate material may then be deposited into the excavated trench via the tube 27. Then, the press wheel 26 may facilitate movement of the excavated soil into the trench to cover the particulate material and compress the soil covering the particulate material. In certain embodiments, the press wheel may not be a part of the row unit. Instead, for example, the press wheel may be mounted to the frame of the implement behind the row unit. Furthermore, while the illustrated row unit includes a ground engaging opener assembly, in alternative embodiments, at least one row unit on the implement may include an applicator assembly configured to deposit particulate material onto the surface of the agricultural field, or any other suitable type of product deposition assembly.

The air cart 12 may centrally store particulate material and distribute the particulate material to the row unit 20. Accordingly, the air cart 12 includes a particulate material metering system 30, a storage tank 32, an air cart frame 34, wheels 36, and an air source 38. In the depicted embodiment, the air cart frame 34 is coupled to the tool frame 19 via the second hitch system 16. The wheels 36 contact the surface 17 to enable the air cart 12 to be towed along with the agricultural implement 11. Additionally, the storage tank 32 may centrally store the particulate material for distribution. In some embodiments, the storage tank 32 may include multiple compartments for storing different types of particulate material. For example, a first compartment may store seeds while a second compartment may store a dry fertilizer. In such configurations, the air cart 12 may deliver both seeds and fertilizer to the agricultural implement 11 via separate distribution systems, or as a mixture through a single distribution system.

The particulate material metering system 30 may control the amount of particulate material distributed to the agricultural field 18. For example, the particulate material metering system 30 may be controlled to increase or decrease the amount of particulate material distributed to the agricultural field 18. As depicted, the particulate material metering system 30 is mounted to the bottom of the storage tank 32, which enables the storage tank 32 to supply particulate material to the particulate material metering system 30. The particulate material metering system 30 may then distribute the particulate material to the row unit 20 via a line 40 extending to the distribution header 21. For example, the air source 38 may be coupled to the line 40 (e.g., conduit), and the air source 38 may provide an air stream to fluidize the particulate material and direct the particulate material through the line 40 toward the distribution header 21. The distribution header 21 may then distribute the particulate material to one or more row units 20 via the hose(s) 22. Some embodiments may include multiple distribution headers 21, with one or more row units 20 fluidly coupled to each distribution header 21 by hose(s) 22 and with a line 40 extending to each distribution header 21. In this manner, the particulate material metering system 30 may control distribution of particulate material from the storage tank 32 to the row units 20 and into the trenches. In additional or alternative embodiments, the particulate material metering system may be a part of or coupled to the row units, and the particulate material metering system may control distribution of the particulate material from the row unit directly to the agricultural field.

Figure 2:
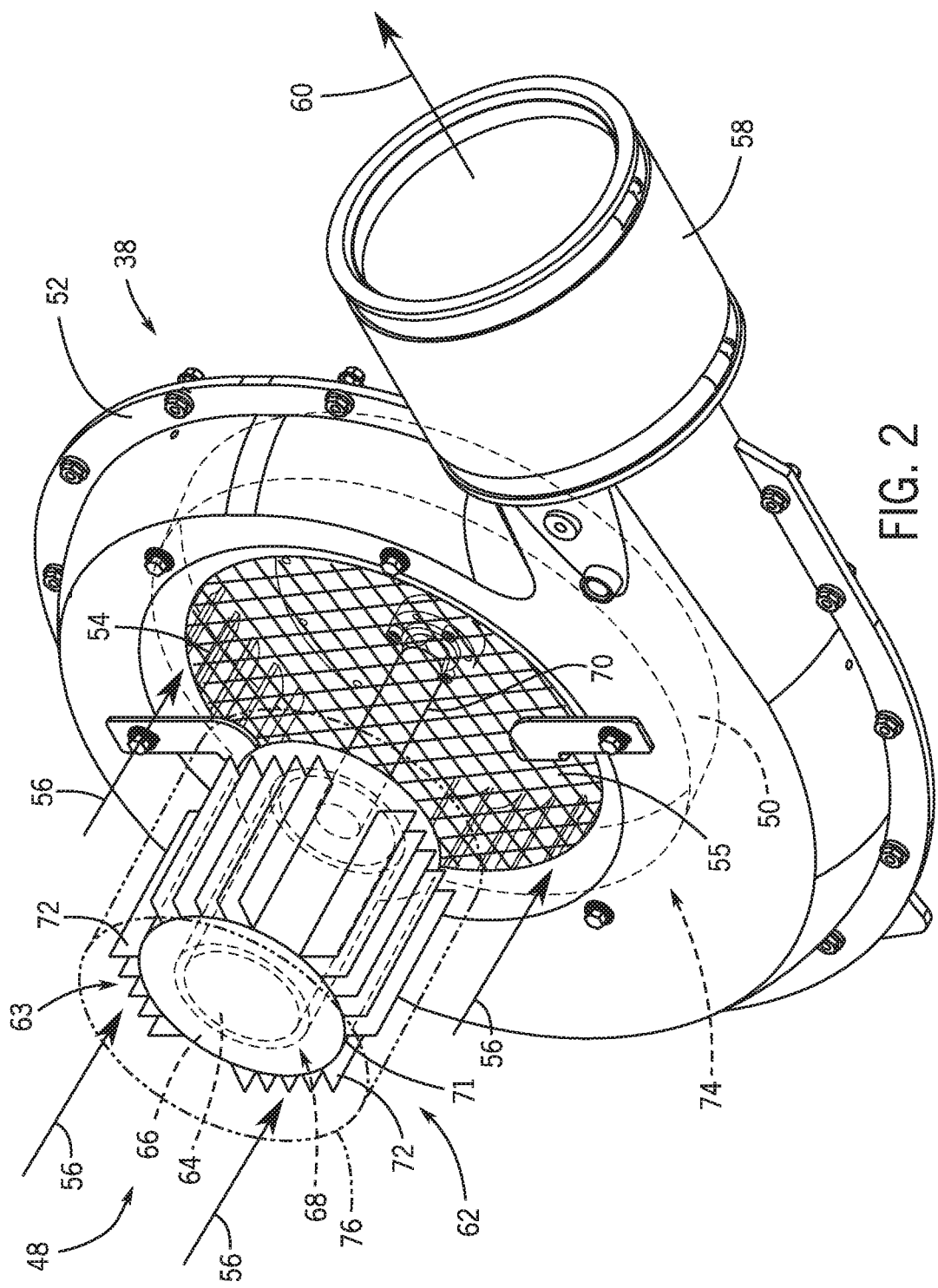
FIG. 2 is a schematic view of an embodiment of an air source system that may be employed within the agricultural system of FIG. 1, in which the air source system has an air source, in accordance with an aspect of the present disclosure.

FIG. 2 is a schematic view of an embodiment of an air source system 48 that may be employed within the agricultural system of FIG. 1, in which the air source system has the air source 38. In the illustrated embodiment, the air source 38 is a blower having a fan 50. The fan 50 is configured to rotate within a blower housing or enclosure 52, and the fan 50 includes blades 54 that, during rotation of the fan 50, draw air (e.g., from an ambient environment) into an inlet 55 (e.g., an opening) of the blower housing 52 in a first flow direction 56. Within the blower housing 52, the blades 54 cause the airflow to flow from the inlet 55 to an outlet passage 58 of the air source 38 and out of the blower housing 52 in a second flow direction 60 (e.g., to the line that extends toward the distribution header). The second flow direction 60 may generally be transverse to the first flow direction 56. As illustrated, the fan 50 is a centrifugal fan configured to establish an airflow path that extends into the inlet 55 of the blower housing 52 in the first flow direction 56 and out of the outlet passage 58 of the blower housing 52 in the second flow direction 60.

The air source system 48 includes a motor assembly 62 configured to drive the fan 50 of the air source 38 to rotate. The motor assembly 62 may include various components configured to drive the fan 50 to rotate during operation of the motor assembly 62. By way of example, the motor assembly 62 may include a motor 63 having a rotor 64 and a stator 66 surrounding the rotor 64. Furthermore, the motor assembly 62 may include electrical components 68 configured to transmit electrical energy to the rotor 64 and/or stator 66 to drive rotation of the rotor 64. For instance, the electrical components 68 may include a direct current (DC)-to-DC converter, an alternating current (AC)-to-DC rectifier, a DC-to-AC inverter, electrical connection(s), and so forth, configured to receive electrical power from a power source (e.g., a generator) and to process the received electrical power into a suitable form for windings of the rotor 64 and/or stator 66. The windings of the rotor 64 and/or stator 66 may generate a magnetic field that causes the rotor 64 to rotate relative to the stator 66. The rotor 64 is connected to a shaft 70 that extends from the motor assembly 62 and couples to the fan 50. Thus, rotation of the rotor 64 causes rotation of the fan 50, thereby establishing the airflow. In additional or alternative embodiments, the motor assembly may not include the electrical components and may use a hydraulic system (e.g., hydraulic motor) to drive rotation of the fan.

In some embodiments, the motor assembly 62 includes a housing or an enclosure 71 in which the electrical components 68 may be disposed. Operation of the motor may cause the electrical components 68 to generate heat. For this reason, the motor assembly 62 may include heat sinks 72 configured to dissipate the heat generated by the electrical components 68, thereby reducing the temperature of the electrical components 68. The heat sinks 72 may include fins, rods, radiators, or any other suitable features to facilitate heat transfer from the electrical components 68 to the airflow. In additional or alternative embodiments, the motor assembly may include a cooling system, such as a refrigeration system, configured to circulate a fluid to transfer heat from the electrical components to the airflow to cool the electrical components.

As indicated above, the motor assembly 62 is positioned in the path of the airflow established by the fan 50. Directing the airflow across the heat sinks 72 of the motor assembly 62 facilitates heat transfer from the electrical components 68 to the airflow, thereby reducing the temperature of the electrical components 68. In the illustrated embodiment, the electrical components 68 of the motor assembly 62 are generally positioned upstream of the fan 50 at an intake section 74 of the air source 38. The intake section 74 may be a side of the blower housing 52 having the inlet 55 through which the air may flow (e.g., as a result of the fan rotation) to enter the blower housing 52, and the motor assembly 62 may be placed near the inlet 55 and positioned to be at least partially external to the blower housing 52. Thus, during operation of the air source 38, the airflow drawn in by the fan 50 may directly flow across the motor assembly 62 (e.g., across the heat sinks 72 of the motor assembly 62) to receive heat from the heat sinks 72, thereby reducing the temperature of the electrical components 68 via convective cooling before flowing into the blower housing 52. As such, positioning the motor assembly 62 in the airflow path may increase cooling of the electrical components 68 to improve performance of the motor assembly 62. Further, the airflow directed across the motor assembly 62 may remove particles, such as dust and debris, that have collected on the motor assembly 62 by forcing the particles off the motor assembly 62. In addition, positioning the motor assembly 62 in the airflow path may substantially reduce accumulation of additional particles on the motor assembly 62. Reducing the particles on and/or within the motor assembly may facilitate heat transfer from the electrical components to the airflow, thereby enhancing the cooling of the electrical components. In certain embodiments, the motor assembly 62 may be manufactured in a manner to reduce heating (e.g., of the electrical components 68) caused by solar energy. By way of example, the motor assembly 62 may include a housing configured to reflect solar energy and/or absorb solar energy that may otherwise be absorbed by other components of the motor assembly 62 (e.g., by the electrical components 68) to reduce absorption of solar energy by the other components of the motor assembly 62.

In certain embodiments, the air source system 48 also includes a filter 76 positioned upstream of the motor assembly 62 relative to the direction of the airflow. The filter 76 may be configured to block particles, such as dust, dirt, and other debris, from engaging the motor assembly 62. In this way, the filter 76 may further reduce particle accumulation on and/or within the motor assembly 62. The filter 76 is formed as a cover configured to wrap around at least a portion of the motor assembly 62 in the illustrated embodiment. In additional or alternative embodiments, the filter may be formed as an enclosure, a panel, or any other suitable component positioned in the airflow path and configured to block particles within the airflow from engaging the motor assembly.

Figure 3:
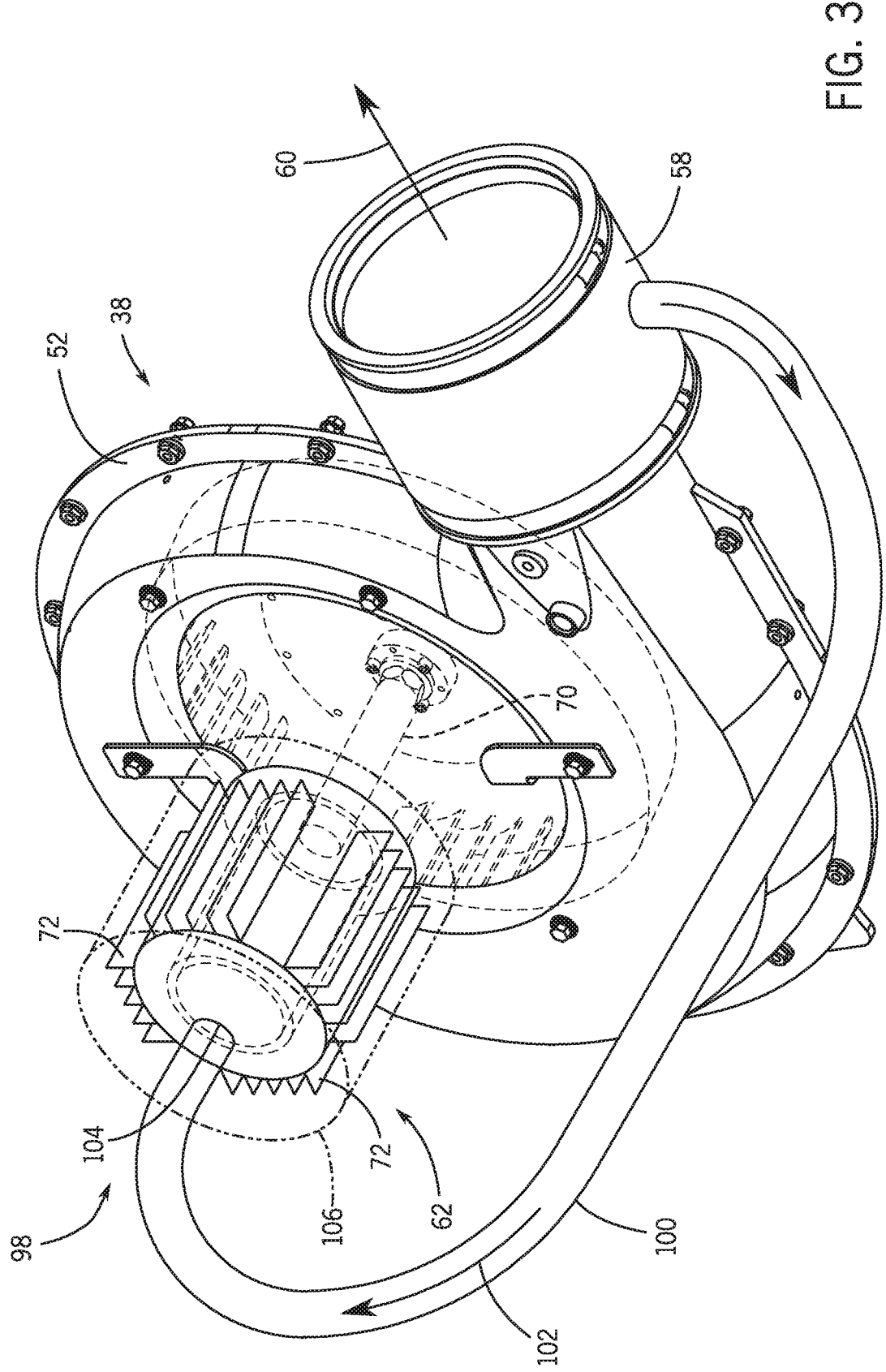
FIG. 3 is a schematic view of another embodiment of an air source system that may be employed within the agricultural system of FIG. 1, in which the air source system has a motor assembly, in accordance with an aspect of the present disclosure.

FIG. 3 is a schematic view of another embodiment of an air source system 98 that may be employed within the agricultural system of FIG. 1, in which the air source system 98 has the motor assembly 62. In the illustrated embodiment, the shaft 70 of the motor assembly 62 is coupled to the fan of the air source 38, but the motor assembly 62 is not disposed at the intake section of the air source 38. As illustrated, the motor assembly 62 is positioned on an opposite side of the blower housing 52 from the intake section. Thus, the airflow that is drawn into the blower housing 52 may not directly flow across the motor assembly 62. However, in the illustrated embodiment, the air source system 98 includes a conduit 100 configured to direct the airflow toward the motor assembly 62, such that the air flows across the motor assembly 62. The conduit 100 is fluidly coupled to the outlet passage 58 of the air source 38 in the illustrated embodiment. Thus, a portion of the air that is flowing through the outlet passage 58 in the second flow direction 60 flows through the conduit 100 in a third flow direction 102. The air then flows out of an opening 104 of the conduit 100 and across the motor assembly 62. A remaining portion of the air flows out of the outlet passage 58 in the second flow direction 60. In this way, the airflow path of the illustrated air source system 98 includes the flow of air in the second flow direction 60 out of the blower housing 52 and the flow of air in the third flow direction 102 through the conduit 100 toward the motor assembly 62.

The conduit 100 directs the airflow from the outlet passage 58 toward the motor assembly 62 in the illustrated embodiment, but in additional or alternative embodiments, the conduit may direct the airflow from another suitable part of the blower housing toward the motor assembly (e.g., from the inlet to the motor assembly, from within the blower housing to the motor assembly, from downstream of the outlet passage to the motor assembly), and/or the conduit may direct air from another suitable component (e.g., from the line fluidly coupled to the outlet passage of the air source) toward the motor assembly. In certain embodiments, multiple conduits may be used to direct multiple airflows across the motor assembly. In some embodiments, the blower housing may also include features, such as baffles, configured to deflect the airflow toward the conduit to increase a flow rate of the airflow through the conduit toward the motor assembly.

The illustrated air source system 48 includes a filter 106 positioned between the conduit and the motor assembly 62. The filter 106, which may be similar to the filter 76 described above with respect to FIG. 2, may capture and block particles within the airflow, thereby substantially reducing particles within the airflow directed through the conduit 100 and toward the motor assembly 62. Thus, the filter 106 blocks the particles from flowing across the motor assembly 62. In additional or alternative embodiments, the filter may be positioned at another suitable location, such as within the blower housing, within the conduit, within the outlet passage, and so forth.

FIG. 4 is a schematic view of a further embodiment of an air source system 128 that may be employed within the agricultural system of FIG. 1, in which the shaft 70 of the motor assembly 62 does not extend directly toward the fan 50 of the air source 38. As illustrated, the motor assembly 62 is positioned in the airflow path downstream of the outlet passage 58, such that the air directed out of the outlet passage 58 in the second flow direction 60 flows across the motor assembly 62. As such, the fan 50 moves the air out of the blower housing 52 and across the motor assembly 62. In some embodiments, the air source system 128 may also include the filter 106 disposed between the outlet passage 58 and the motor assembly 62 to block particles from flowing out of the outlet passage 58, thereby substantially reducing accumulation of particles on and/or within the motor assembly 62.

Since the shaft 70 of the motor assembly 62 does not extend directly toward the fan 50, the air source system 128 may include a linkage system 130 configured to couple the shaft 70 to the fan 50. The linkage system 130 enables the rotation of the shaft 70 to drive rotation of the fan 50. For instance, the linkage system 130 may include gear(s), link(s), pivot joint(s), rigid and/or flexible shaft(s), and/or any other suitable mechanical components or features to transfer torque from the motor 63 to the fan 50. Rotation of the shaft 70 drives the components of the linkage system 130 to rotate, thereby driving rotation of the fan 50. As such, the linkage system 130 enables the motor assembly 62 to drive rotation of the fan 50 while positioned in the airflow path downstream of the outlet passage 58.

In additional or alternative embodiments, the motor assembly may be positioned in any other suitable location in the airflow path such that the airflow is directed across the motor assembly, thereby improving performance of the motor assembly. By way of example, the motor assembly may be positioned within the outlet passage, within another section in the blower housing, at another suitable position at the intake section, and so forth. In embodiments in which the motor assembly is positioned such that the shaft does not extend linearly to the fan, the air source system may include a corresponding linkage system to enable the shaft to drive the fan to rotate.

FIG. 5 is a perspective view of another embodiment of an air source system 150 that may be employed with an agricultural system (e.g., a planter). The air source system 150 may be a vacuum source coupled to one or more vacuum seed meters. During operation, air source system 150 may establish an airflow that enables the vacuum seed meter(s) to operate and move particulate material. In the illustrated embodiment, the air source system 150 has an enclosure 152, a fan 154 disposed within the enclosure 152, and tubing or conduits 156 coupled to the enclosure 152. The tubing 156 may provide an airflow through an opening of the enclosure 152. During operation of the air source system 150, the fan 154 may rotate within the enclosure 152, thereby drawing air through the tubing 156 and into the enclosure 152 along intake direction 158. The fan 154 may also direct the airflow in an outlet direction 160 toward ductwork 162, which may eject the airflow out of the enclosure 152, such as into an ambient environment. In this manner, operation of the fan 154 establishes an airflow path through the tubing 156 along the intake directions 158, into the enclosure 152, and out of the enclosure 152 into the ductwork 162 along the outlet direction 160. As shown in the illustrated embodiment, the intake directions 158 are transverse to the outlet direction 160. The fan 154 may be a centrifugal fan.

The fan 154 is driven by a motor assembly 164, which may be similar to the motor assembly described above. Operation of the motor assembly 164 drives rotation of the fan 154, which establishes the airflow through the air source system 150. The motor assembly 164 is positioned within the airflow path of the air source system 150. For example, the motor assembly 164 may be positioned upstream of the fan 154 and external to the enclosure 152, such as within the tubing 156. Therefore, the air drawn into the enclosure 152 via the tubing 156 is directed across the motor assembly 164. In such embodiments, a filter may be implemented (e.g., positioned within the tubing 156) to improve the quality of the airflow drawn into the enclosure 152. Furthermore, in such embodiments, the motor assembly 164 may be positioned such that a shaft of the motor assembly 164 extends linearly to the fan 154. Thus, rotation of the shaft of the motor assembly 164 drives the fan 154 to rotate without the use of a linkage system. In additional or alternative embodiments, the motor assembly may be positioned in another suitable location (e.g., in the ductwork, external to the tubing). Thus, the air source system may have a linkage system to enable the motor assembly to drive the fan to rotate and/or a conduit to direct air across the motor assembly.

The features disclosed herein regarding positioning a motor assembly within the airflow may be applied to any suitable agricultural system (e.g., for any suitable component of an agricultural system). For example, a motor assembly for a combine separator may also be positioned in an airflow path established by a fan of the combine separator. Indeed, a motor assembly configured to drive any fan may be positioned in the airflow path established by the fan. Moreover, while the embodiments described herein are directed to a motor assembly configured to drive a centrifugal fan, the motor assembly may be configured to drive any suitable fan (e.g., axial fan) that establishes an airflow along an airflow path.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An air source system of an agricultural system, comprising:
    an enclosure comprising an inlet opening and an interior, wherein the inlet opening defines a boundary between the interior of the enclosure and an exterior environment;
    a fan disposed within the interior of the enclosure and configured to establish an airflow along an airflow path of the air source system via rotation of the fan, wherein the fan comprises an end surface and blades extending from the end surface and positioned radially offset from the inlet opening of the enclosure to draw the airflow into the inlet opening along a linear direction during the rotation of the fan, and the end surface of the fan and the inlet opening are positioned at opposite ends of the blades; and
    a motor assembly configured to drive the fan to rotate, wherein the motor assembly comprises a motor assembly housing positioned in the exterior environment outside of the inlet opening and within the airflow path of the air source system, the motor assembly housing has a cross-sectional area that overlaps an area of the inlet opening of the enclosure such that the airflow directed into the inlet opening along the linear direction passes over the motor assembly housing during the rotation of the fan, the cross-sectional area of the motor assembly housing is smaller than the area of the inlet opening, and the motor assembly comprises a shaft that extends between the motor assembly housing and the end surface.

2. The air source system of claim 1, wherein the motor assembly comprises an electrical component.

3. The air source system of claim 1, wherein the motor assembly comprises a heat sink coupled to the housing, and the motor assembly is positioned such that the heat sink is within the airflow path.

4. The air source system of claim 2, wherein the electrical component comprises a direct current (DC)-to-DC converter, alternating current (AC)-to-DC rectifier, DC-to-AC inverter, wiring, or any combination thereof.

5. The air source system of claim 1, wherein the fan is a centrifugal fan.

6. The air source system of claim 1, wherein the fan is a part of a blower or a vacuum source of the agricultural system.

7. An agricultural system, comprising:
    an air source comprising an enclosure and a fan disposed within the enclosure, wherein the enclosure comprises an inlet having an area, the inlet defines a boundary between an interior of the enclosure and an exterior environment, the fan comprises an end surface and blades extending from the end surface and positioned radially outward from the inlet to direct airflow into the inlet in a linear direction along an airflow path during rotation of the fan, the end surface and the blades define and are exposed to a space extending between the blades, and the end surface of the fan and the inlet are positioned at opposite ends of the blades; and
    a motor assembly configured to drive the fan in rotation to direct the airflow in the linear direction along the airflow path, wherein the motor assembly comprises a motor assembly housing positioned within the exterior environment outside of the inlet and within the airflow path the motor assembly housing has a cross-sectional area that is smaller than and overlaps the area of the inlet to enable the airflow directed in the linear direction to pass over the motor assembly housing, the end surface of the fan faces the motor assembly, and the motor assembly comprises a shaft that extends between the motor assembly housing and the end surface.

8. The agricultural system of claim 7, comprising tubing coupled to the enclosure, wherein the fan is configured to direct the airflow through the tubing such that the airflow path extends through the tubing, and the motor assembly is disposed within the tubing.

9. The agricultural system of claim 8, wherein the enclosure is configured to couple to ductwork, and the air source is configured to direct the airflow through the tubing into the ductwork.

10. The agricultural system of claim 7, comprising a filter positioned upstream of the motor assembly relative to a flow direction of the airflow along the airflow path.

11. An air source system of an agricultural system, comprising:
    a housing comprising an opening and an interior, wherein the opening defines a boundary between the interior of the housing and an exterior environment;
    a fan disposed within the interior of the housing, wherein the fan comprises an end surface and blades extending from the end surface and positioned radially outward from the opening of the housing, the fan is configured to rotate relative to the housing to cause the blades to draw air into the opening of the housing in a linear direction and to direct the air out of the housing via an outlet passage of the housing, and the end surface of the fan and the opening are positioned at opposite ends of the blades; and a motor assembly coupled to the fan, wherein the motor assembly is configured to drive the fan to rotate, the motor assembly comprises a motor assembly enclosure positioned in the exterior environment outside of the opening and radially inward from a periphery of the opening of the housing such that the air flows across the motor assembly enclosure in the linear direction during operation of the air source system, the motor assembly enclosure has a cross-sectional area that is smaller than and overlaps an area of the opening, the blades of the fan extend from the end surface toward the motor assembly enclosure, and the motor assembly comprises a shaft that extends between the motor assembly enclosure and the end surface.

12. The air source system of claim 11, comprising a conduit fluidly coupled to the outlet passage of the housing, wherein the conduit is configured to direct a portion of the air from the outlet passage toward the motor assembly such that the air flows across the motor assembly in the linear direction during operation of the air source system.

13. The air source system of claim 12, comprising a filter positioned between the outlet passage and the motor assembly.

* * * * *